United States Patent
Kubiak

(10) Patent No.: US 6,654,288 B2
(45) Date of Patent: Nov. 25, 2003

(54) METHOD AND DEVICE FOR BACKING UP DATA IN A MEMORY MODULE AND MEMORY MODULE

(75) Inventor: Claus-Peter Kubiak, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/261,801

(22) Filed: Sep. 30, 2002

(65) Prior Publication Data

US 2003/0081468 A1 May 1, 2003

(30) Foreign Application Priority Data

Sep. 28, 2001 (DE) .......................... 101 48 047

(51) Int. Cl.⁷ .................. G11C 16/04; G06F 12/08
(52) U.S. Cl. ................. 365/185.22; 707/202; 707/204; 711/162
(58) Field of Search ................. 365/185.22, 185.09, 365/201; 707/202, 204; 711/162, 111

(56) References Cited

U.S. PATENT DOCUMENTS 5,694,538 A    12/1997  Okazaki et al.
6,092,086 A *  7/2000   Martin et al. ................ 707/202
6,460,055 B1 * 10/2002  Midgley et al. ............. 707/204
6,529,976 B1 *  3/2003  Fukuzawa et al. ............ 710/65
6,546,474 B1 *  4/2003  Weigelt ....................... 711/162

FOREIGN PATENT DOCUMENTS

DE    198 39 680        9/1998
EP    0 919 967 A2      9/1998
EP    0 990 989 A2      9/1999

* cited by examiner

Primary Examiner—Son T. Dinh
(74) Attorney, Agent, or Firm—Kenyon & Kenyon

(57) ABSTRACT

Method and device for backing up data in a non-volatile memory module and a memory module, the data being stored multiple times in the memory module, the data being backed up using at least one check identifier such that the check identifier and a bit-by-bit content of the data are correlated and at least one validity identifier stipulates which of the data stored multiple times may be read out, in addition to the data the check identifiers belonging to the data and the validity identifiers belonging to the data also being stored multiple times in the memory module and assigned to the corresponding data and the backup of the data further being performed through the feature that at least the data stored multiple times in the memory module is logically linked bit-by-bit when read out.

8 Claims, 4 Drawing Sheets

METHOD AND DEVICE FOR BACKING UP DATA IN A MEMORY MODULE AND MEMORY MODULE

FIELD OF THE INVENTION

The present invention relates to a method and a device for backing up data in a non-volatile memory module and a memory module, the data being stored multiple times in the memory module.

BACKGROUND INFORMATION

A method of recording data and programs in at least one first memory of a computer system is known from German Published Patent Application No. 198 39 680. In that method the programs are divided into at least first programs and second programs. In addition to the first memory at least one second memory is utilized, a defined division into memory areas being stipulated. The data is backed up in the memory areas through the feature that a backup copy is created in at least one of the at least two memories before the data and programs are deleted, copied, or read in. Upon successful programming this backup copy is either deleted or reused as an original; in other words, it does not need to be permanently stored or newly recorded from outside.

Many different methods are known for recognizing data errors, for example in the event of faulty saving or programming operations. For this purpose the data needs to be represented in an error code or error recognition code. Such information may for example be parity bits which allow error recognition through the creation of checksums, for use in odd parity checking and/or even parity checking, for example.

Other check methods which can be executed linearly and/or cyclically are known, such as the Hemming code, the BCH code (Boise, Chandhuri, Hocquenghem), and the Abramsen code. Another member of this group of checking methods is also the cyclic redundancy check (CRC) in which check bytes are created on each block by the CRC method from the data, except for the information to be deleted or copied or read in, these check bytes being processed or recorded together with that information. However, generally the memory capacity needed for these check bytes or check bits is very high.

In these methods it is generally not guaranteed that either immediate data losses or gradual data losses in a non-volatile memory module can be recognized and corrected; in other words, while the previously known methods are able to recognize, for example, gradual data losses, such as bit upsets, they are generally unable to correct them.

The object of the present invention is thus based on optimizing the situation described above, in particular to recognize and to correct both immediate data losses and also gradual data losses in a non-volatile memory module.

SUMMARY OF THE INVENTION

The present invention relates to a method and a device for backing up data in a non-volatile memory module and a corresponding memory module, the data being stored multiple times in the memory module and the data being backed up using at least one check identifier such that the check identifier and a bit-by-bit content of the data are correlated, at least one validity identifier stipulating which of the data stored multiple times is readable and may thus be read out. In this system it is advantageous if in addition to the data the particular check identifiers belonging to the data and the particular validity identifiers belonging to the data are also stored multiple times in the memory module and assigned to the corresponding data, the backup of the data further being advantageously performed through the feature that at least the data stored multiple times in the memory module is logically linked bit-by-bit when read out.

The data is advantageously assigned an OR function at the bit level when read out through which bit upsets, in other words gradual data losses, may be prevented or corrected.

Here it is advantageous that data which has been incompletely or erroneously stored is recognized on the basis of the at least one check identifier and/or on the basis of the at least one validity identifier, other complete and error-free data from the redundant and multiply stored data then being read out.

It is also advantageous if a first and a second validity identifier are used, the first validity identifier indicating whether the data assigned to this validity identifier may be read out, i.e., is valid, and the second validity identifier specifying whether the data may be stored in an area of the memory module such that the data present in this area may be replaced; in other words, the data already present is obsolete.

Here it is expedient if at least one validity identifier is set to a first value before the data is stored in the memory module and to a second value after the data has been stored completely, the first value and the second value differing by more than one bit and with a check of the validity identifier determining only whether the value is unequal to, and in particular greater than, the first value. This has the advantage that individual bit upsets or individual data losses with regard to the validity identifier have no negative impacts on the result of the check.

In this way through the method of the device and the memory module both immediate data losses, such as interruptions in recording, and gradual data losses, such as bit upsets, are advantageously recognized and corrected.

In particular, the memory module according to the present invention is not volatile, the data being storable electrically or optically or magnetically, and the memory module being formed in such a way that data may be rewritten to it electrically or optically or magnetically.

DETAILED DESCRIPTION

On the basis of a description of an exemplary embodiment the invention will now be explained in greater detail. An exemplary embodiment is described below in which the memory module is formed as a non-volatile memory module, in particular as an EEPROM. Instead of an EEPROM, any other specifically non-volatile memory module may be used, such as a flash EPROM or any other flash module or also any other memory module that in particular may be overwritten with data optically or magnetically or electrically. The method and the device and the memory module have to fulfill the following functions: the saving of the data in the memory module, the reading of the data back out of the memory module, the recognition and correction of gradual data losses, and the recognition of interruptions in write operations; in other words, immediate data losses. In the rest of this example only an EEPROM is discussed; however, as already pointed out, this is not to be understood as restricting the content of the invention.

Figure 1:
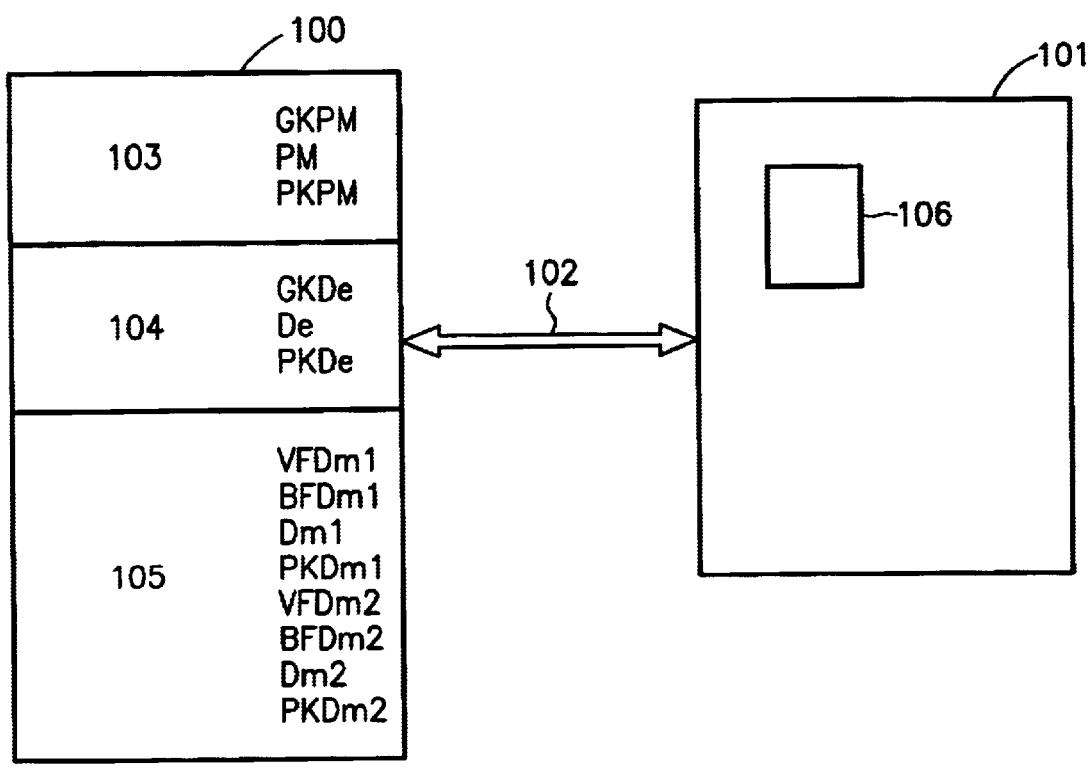
FIG. 1 shows a possible memory layout of a module according to the present invention.

FIG. 1 shows a possible memory layout of EEPROM module 100. First area 103 contains a specific test pattern PM as an identifier for the memory layout used. This test pattern PM may be protected in particular by a validity identifier GKPM, in the form of a validity flag, and by a check identifier PKPM, in particular a checksum. Second area 104 contains data De which is stored only once, this data De also being backed up using validity identifier GKDe and check identifier PKDe.

Third area 105 contains data Dm specifically backed up according to the present invention, which is stored multiple times, in particular twice. In this example, in particular two validity identifiers are used: a validity flag VF and a block flag BF. Thus data Dm stored multiple times, in this case twice (Dm1 and Dm2), is each backed up with a validity flag VFDm and a block flag BFDm and may be checked with a check identifier, in particular a checksum PKDm. A data record according to the present invention thus consists of VFDm1, the validity flag for data Dm1 stored multiple times, a block flag BFDm1 for data Dm1 stored multiple times, data Dm1 itself and a check identifier PKDm1, in particular a checksum. The two validity identifiers VFDm1 and BFDm1 will be described in greater detail below.

The structure for data Dm1 then repeats for data Dm2, and is thus also stored multiple times with respect to validity identifiers VFDm2 and BFDm2 and check identifier PKDm2.

The memory module is connected to a control unit, in particular a processor, micro-processor, microcomputer, microcontroller or similar, through an interface 102 not specified in greater detail, as part of a sequence control system.

All areas of the memory module, in particular of EEPROM 100, share the common feature that data De or Dm or PM for the check pattern is protected by validity identifiers and check identifiers. In particular the data in the third area, in addition to first validity identifiers VFDm1 and VFDm2, is protected by additional validity identifiers, block flags BFDm1 and BFDm2.

Using check pattern PM in first area 103 a decision is made whether or not the memory layout in the EEPROM is compatible with the application. If the memory layout in the EEPROM is not compatible with the application, default values are copied into the EEPROM.

In general an undesired data loss will occur as a result of direct phenomena, i.e., immediate data losses, such as interruptions in write operations or supply voltage outages, and/or as a result of indirect phenomena, i.e., gradual data losses, such as bit upsets, for example.

Protection against data loss through direct phenomena takes place in the following way:

At the beginning of a saving operation the appropriate validity flag, for example VFDm1, is set in the EEPROM to a first value, specifically 0X00. When saving is completed and the check identifier is updated, a second value, specifically 0XFF, is written into validity flag VFDm1 as the validity identifier. When the data is read back out, for example into a volatile memory 106, specifically a working memory such as a RAM, which is equivalent to reading the data out of the non-volatile memory module, the data is examined for validity, and thus for readability, with validity identifier VFDm1 being checked. If validity flag VFDm1 is equal to the first value, in this case 0X00, the data has not been completely written or stored. If validity flag VFDm1 is identical to second value 0XFF, the data has been completely written. According to the present invention, however, the check is not made for equality with the second value, for example 0XFF, but only for whether the value for validity flag VFDm1 is greater than first value 0X00. The advantage of this procedure is that individual bit upsets, in other words individual gradual data losses in validity flag VFDm1, do not have any negative effects on the result of the check.

The protection against data loss through indirect processes, for example a gradual data loss resulting from bit upsets, will now be described. In the event of such a gradual data loss, in particular in the event of bit upsets, the content of a memory cell of the non-volatile memory changes, for example, from logical 0 to logical 1 or vice versa. Bit upsets may thus occur both when current is present and when it is absent. Thus, for example, bit upsets from logical 1 to logical 0 may result if the memory cells in the EEPROM are written very frequently at high temperatures. The bit upsets result from physical conditions and occur as a result of a voltage loss occurring very slowly in an EEPROM cell. Every write operation, including, for example, a refresh, results in an additional opportunity for such a bit upset. Consequently according to the present invention a byte or a bit or another data block of any desired length is written into the EEPROM only if the content of the data item stored there previously is no longer up-to-date, in other words is obsolete and thus may or should be replaced.

The task of recognizing and largely compensating for bit upsets is fulfilled by the feature that the data is stored in duplicate in the EEPROM. Through the check identifier and the validity identifiers, as described according to the present invention, the saving operation, in other words the storage, reading in and reading out, is controlled in such a way that inconsistencies are recognized and eliminated. In this process, the validity identifiers are divided according to the present invention into two types, the validity flags and the block flags, already referred to.

The essential task of the validity flags has already been described. The block flags, on the other hand, serve inter alia to control the saving operation in such a way that the data is first written into the invalid or obsolete part of the double data store in area 105. This means that initially the incomplete or erroneous or obsolete portion of the double data store for Dm1 or Dm2 is first written with the corresponding validity identifiers and check identifiers. In order to be able to correct bit upsets, in other words gradual data losses, when the data is read back out of the EEPROM, in particular into RAM 106, in other words during the reading out of the data, both sides of the double data store, as described, are always assigned data.

Directly after the saving operation, in other words the storage of the data, the data has to be read back out of the EEPROM and compared. If repeated reading back reveals an erroneous write operation, the saving operation is interrupted and an error is reported to a super ordinate monitoring unit. This super ordinate monitoring unit is represented in particular by the microcomputer, i.e., control unit 101, or is connected to control unit 101. Through the read-back operation the correction procedure may be performed for gradual data losses or bit upsets, and also for sudden data losses such as interruptions in the write operation.

At the beginning of the saving process, in other words the storage of the data and identifiers, the block flags are set to a certain value, for example 0X00. If both blocks, i.e., the data and the identifiers for Dm1 and Dm2, have been written, the block flags are set to a second value, for example 0XFF. During the read-back operation, there is an examination of whether the data is up-to-date. If block flag BFDm1=0X00, then the data is obsolete. If block flag BFDm1=0XFF, in other words is identical to the second value, then the data in data block Dm1 or the related storage block (area in the memory for data and identifiers) is up-to-date. According to the present invention, however, the check is not for equivalence with the second value, but for non equivalence with the first value. In particular, the check determines whether or not block flag BFDm1>0. If the block flag>0, the data in the block is up-to-date. Here, too, the advantage is that individual bit upsets in the block flag do not have any negative impact on the result of the check, as in the case of the validity flags. The same applies to BFDm2.

The process described so far, in particular as it relates to validity flags VFDm1 and block flags BFDm1, also generally applies to the second storage block, in other words validity flag VFDm2 and BFDm2 as well as the data and check identifiers.

The reading back of the data generally takes place, as already described, with the data being copied from the EEPROM into the RAM. During this step there has to be a decision as to the cases in which this is possible, i.e., when copying is not possible and default values have to be copied into the RAM.

Provided that the EEPROM module as a whole is functioning perfectly, the decision is dependent on the validity of the checksums and the condition of the validity flags and block flags.

Figure 2:
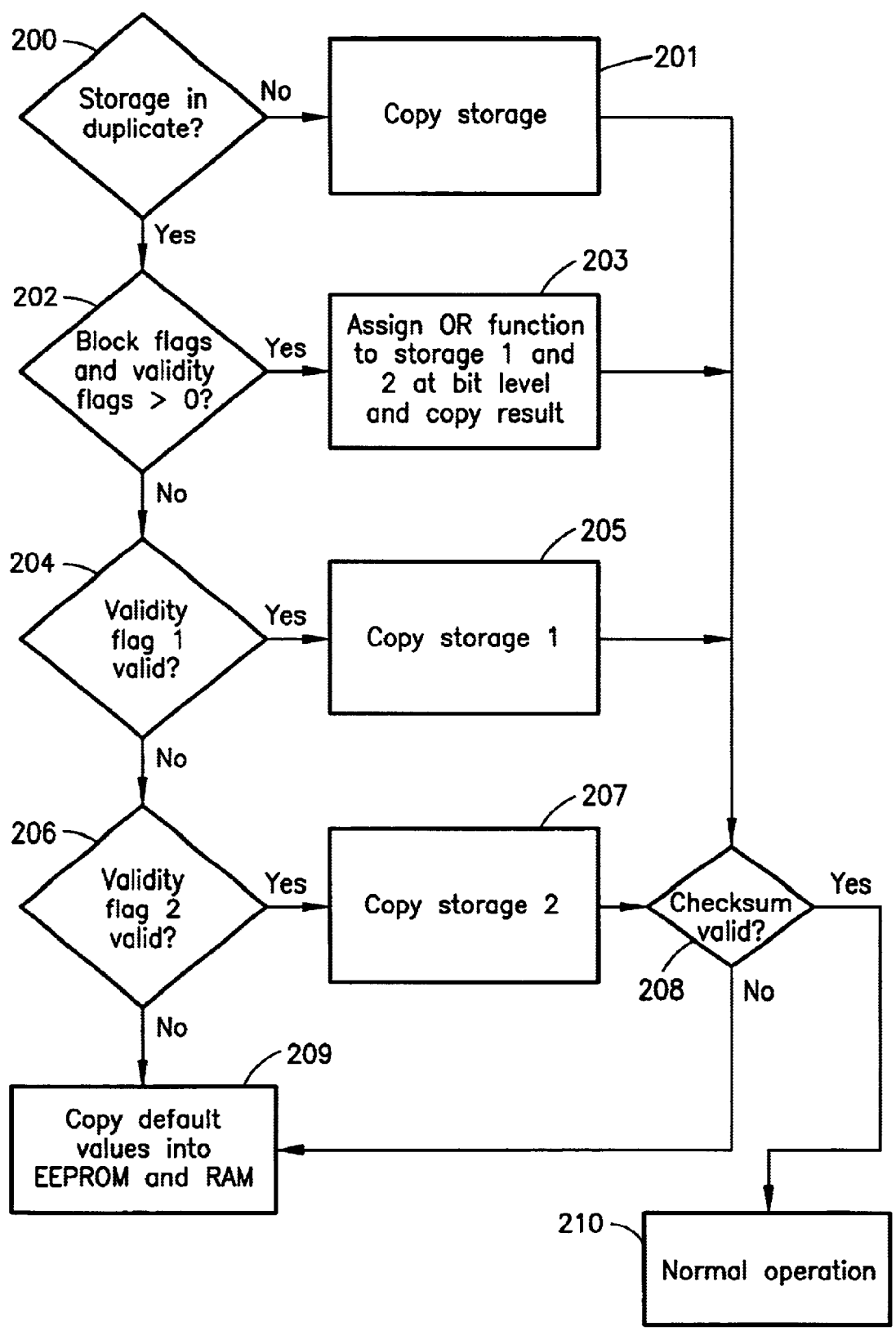
FIG. 2 shows a method by which the data is read out from the memory module and evaluated.

FIG. 2 shows once again the manner in which the data are read out of the EEPROM and evaluated. If the data is stored in duplicate and all validity flags and block flags are unequal to zero, the bit upsets are corrected through the feature that all bit data are logically linked, and in particular are assigned an OR function at the bit level.

In block 200 a check is performed on whether or not storage in duplicate is present. If this is not the case the method moves on to block 201 in which the storage, in other words the data with the corresponding identifiers (validity and check identifiers) is copied. The method then moves on to block 208, where the validity of the check identifier, specifically the checksum, is examined. If the checksum is valid, the method moves on to block 210 and normal operation; if the checksum is invalid, then in block 209 default values are copied into the EEPROM and RAM. If storage in duplicate is present, the method moves on to block 202, where there is a check on whether the block flags and validity flags are >0 as described above. If this is the case, the method moves on to block 203 where the data storage, i.e., storage 1 and 2, is logically linked and in particular the data is assigned an OR function at the bit level and the result is copied specifically into the RAM. Here too the method moves on to check 208 for validity of the checksum with the same results, normal operation and copying of the default values, as a function of validity of the checksum. If the block flags and validity flags are not >0, in other words an error has occurred, in block 204 there is initially a check on validity flag 1, VFDm 1, for validity. If it is valid, in block 205 data and identifiers are stored for Dm1, i.e., in storage 1, and this is again followed by the examination for a valid checksum in block 208 with the results as previously described.

If validity flag 1, i.e., VFDm1, is not valid, then validity flag 2, VFDm2, is checked for validity (in block 206). If VFDm2 is valid, storage 2, i.e., data and identifiers for Dm2, is copied and again the checksum is examined for validity (in block 208) with the corresponding results. If validity flag 2 is also invalid, the method moves directly to block 209 in which the default values are copied into the EEPROM and RAM.

Figure 3A:
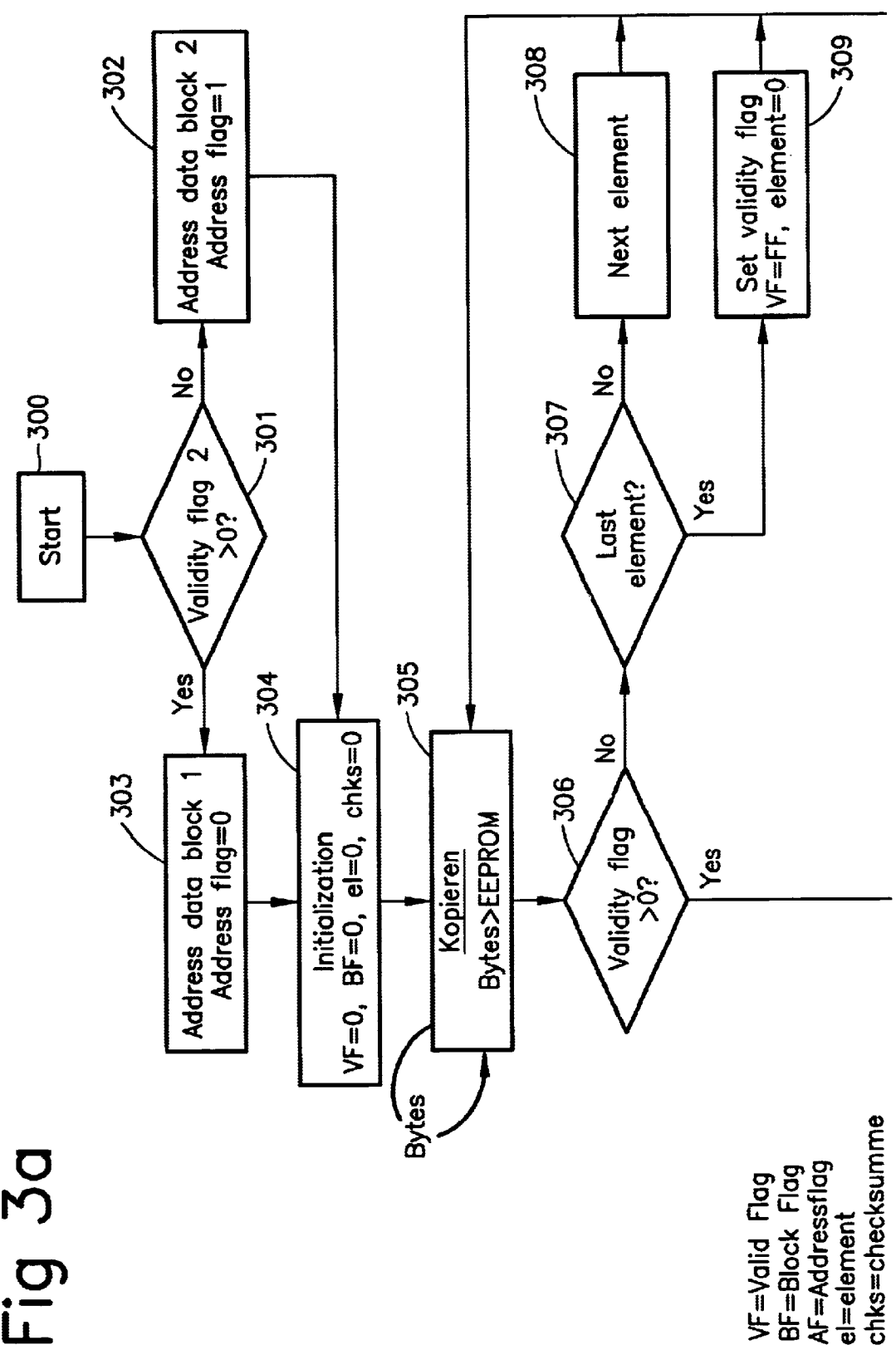
FIG. 3 shows how the data is stored in the memory module.
Figure 3B:
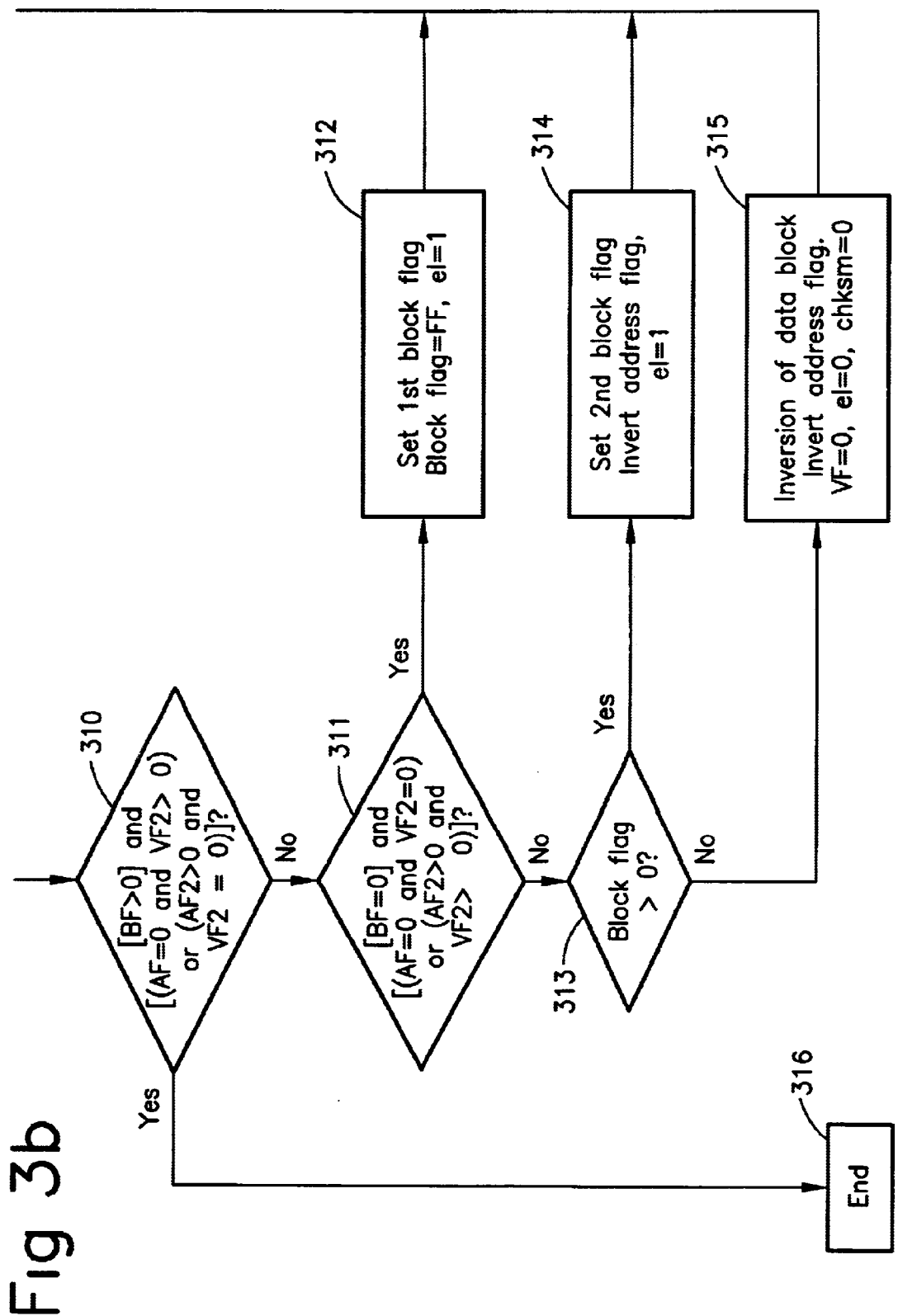

FIG. 3 now shows a possibility according to the present invention for the data to be stored or saved into the EEPROM. The start of the method is in block 300. In query 301 there is a check on whether validity flag 2, i.e., VFDm2, is >0. If this is not the case, i.e., the data in data block 2 is invalid, in block 302 storage 2 or data block 2 is addressed using an address flag AFT which for example is then set to 1. From block 302 the method moves on to block 304 where the validity flag, the block flag and the checksum of the data block to be written are initialized. In the opposite case, in other words when a valid validity flag VFDm2>0 indicates correct data in storage 2 or block 2, storage 1 is first addressed in block 303.

Likewise an element El is initialized in 304. The following copy operation may take place by bytes, by bits, or by data blocks of some other format, with a particular possibility being that of grouping by cells in accordance with the EEPROM. This unit in which the method, specifically the copy or storage operation, is performed, in other words a bit, a byte, or a data block of another format, is designated with element El as the control variable.

The initialization in block 304 takes place in particular through the feature that the flags and the checksum are set to 0 (0X00). If validity flag 2, i.e., VFDm2, is not >0, data block 1, as already described, is addressed, this being the storage belonging to Dm1, during which step address flag AFT is set specifically to 0. Here too after the addressing of storage 1 the initialization takes place in block 304, but in this case it is identifiers VFDm1, BFDm1, and PKDm1 for Dm1 that are initialized.

In block 305 elements El, for example here the bytes, are copied into the EPROM, as described below. Firstly, each byte, in other words element El, is checked to determine whether or not the validity flag is >0, in other words whether the storage or write operation is completed or not. If the validity flag is not >0, i.e., the copy operation has not been completed, in block 307 there is a check on whether last element El that has to be copied is present. If this is not the case, the method moves on to block 308, the next element, thus causing incrimination of El, and then to repeated copying in block 305.

If the last element has been selected, the validity flag is set in block 309, for example to value 0XFF, and element El is again initialized to 0. The method reaches copy block 305 for the last time. If the validity flag is now >0 (if no error, since validity flag has been set) the method moves on to block 310.

In this block for example the following condition is checked for:

Block flag BF>0 (D and [(address flag=0 and validity flag 2>0) or (address flag>0 and validity flag 2=0)].

Repeat of the condition with explanations in braces:

Block flag BF>0 {data up-to-date?} and [(address flag=0 {storage 1} and validity flag 2>0 {storage 2 complete}) or (address flag>0 {AF=1, storage 2} and validity flag 2=0) {storage 2 not complete }]

If this condition is fulfilled, the method reaches its end in block 316.

If the condition is not fulfilled, the method moves on to block 311, where there is a further examination of whether block flag=0 and [(address flag=0 and validity flag 2=0) or (address flag AF>0 and validity flag 2>0)].

Repeat of the condition with explanations in braces:
Block flag=0 {data not up to date} and [(address flag=0 {storage 1} and validity flag 2=0) {storage 2 not complete} or (address flag AF>0 {AF=1, storage 2} and validity flag 2>0) {storage 2 complete}]

If this is the case, the first block flag, i.e., BFDm1, is set, for example to value 0XFF in block 312 and element el is set to 1.

If the query in block 311 does not produce a result meeting the condition, the method moves on to block 313. Here there is a check on whether the block flag>0. If this is the case, second block flag BFDm2 is set, address flag AF is inverted and element el is set to 1 (in block 314.)

If the block flag is not >0, the method moves on to block 315, where an inversion between the data blocks takes place, i.e., from storage 1 to 2 or vice versa (depending upon the conditions of the previous method), address flag AF is also inverted and the validity flag, element el and the checksum are set to 0, i.e., initialized. From block 312, 314, and 315 the method again reaches block 305, the copying of bytes into the EEPROM.

This results in a method for secure protection of data in non-volatile, rewritable memory modules, in which method the data, including the validity identifiers and check identifiers, is stored in the memory module multiple times, the validity of the data being marked by one or more validity flags, the validity of the data being protected by one or more checksums, and the evaluation of the data being controlled by the condition of the validity flags and the correctness of the checksums.

Data losses are further corrected in that data stored multiple times is logically linked with one another and write interruptions are recognized through the condition of the validity flags and the correctness of the checksums. If write interruptions are detected, the method moves on to another valid storage. As described in FIG. 1, the memory module is connected to a sequence control device, for example a microprocessor, in other words a controller. The memory module may be rewritten with data electrically, magnetically, and optically.

What is claimed is:

1. A method of backing up data in a non-volatile memory module, comprising:

storing the data multiple times in the memory module;

backing up the data using at least one check identifier such that the at least one check identifier and a bit-by-bit content of the data are correlated and at least one validity identifier stipulates which of the data stored multiple times may be read out; and in addition to the data, storing multiple times in the memory module and assigning to the corresponding data those of the at least one check identifier belonging to the data and those of the at least one validity identifier belonging to the data, wherein:

the backing up of the data is carried out in that at least the data stored multiple times in the memory module is logically linked bit-by-bit when the data is read out.

2. The method as recited in claim 1, wherein:
the data is assigned an OR function at the bit level when read out.

3. The method as recited in claim 1, wherein:
one of incompletely stored data and erroneously stored data is recognized on the basis of at least one of the at least one check identifier and the at least one validity identifier, other, complete and error-free data from the data stored multiple times then being read out.

4. The method as recited in claim 1, wherein:
a first one of the at least one validity identifier and a second one of the at least one validity identifier are used, the first one of the at least one validity identifier indicating whether the data assigned to the first one of the at least one validity identifier may be read out and the second one of the at least one validity identifier stipulating whether data may be stored in an area of the memory module such that the data present in the area may be replaced.

5. The method as recited in claim 1, wherein:
the at least one validity identifier is set to a first value before the data is stored in the memory module and to a second value after the data has been stored completely, the first value and the second value differing by more than one bit and with a check of the at least one validity identifier determining only whether the second value is unequal to the first value.

6. A device, comprising:

a non-volatile memory module;

a control unit for backing up data in the non-volatile memory module;

an arrangement for storing the data multiple times in the memory module;

an arrangement for backing up the data using at least one check identifier such that the at least one check identifier and a bit-by-bit content of the data are correlated and at least one validity identifier stipulates which of the data stored multiple times may be read out; and an arrangement for, in addition to the data, storing multiple times in the memory module and assigning to the corresponding data those of the at least one check identifier belonging to the data and those of the at least one validity identifier belonging to the data, wherein:

the backing up of the data is carried out in that at least the data stored multiple times in the memory module is logically linked bit-by-bit when the data is read out.

7. A memory module for backing up data, the data being stored multiple times in the memory module, comprising:

an arrangement for storing the data multiple times in the memory module;

an arrangement for backing up the data using at least one check identifier such that the at least one check identifier and a bit-by-bit content of the data are correlated and at least one validity identifier stipulates which of the data stored multiple times may be read out; and an arrangement for, in addition to the data, storing multiple times in the memory module and assigning to the corresponding data those of the at least one check identifier belonging to the data and those of the at least one validity identifier belonging to the data, wherein:

the backing up of the data is carried out in that at least the data stored multiple times in the memory module is logically linked bit-by-bit when the data is read out.

8. The memory module as recited in claim 7, wherein:
the memory module is non-volatile and data may be stored one of electrically, optically, and magnetically, the memory module being designed such that the memory module may be rewritten with data one of electrically, optically, and magnetically.

* * * * *